United States Patent [19]

Mochizuki et al.

[11] Patent Number: 4,572,608

[45] Date of Patent: Feb. 25, 1986

[54] OPTICAL DE-POLARIZER

[75] Inventors: Kiyofumi Mochizuki, Tokyo; Yoshinori Namihira, Kanagawa, both of Japan

[73] Assignee: Kokusai Denshin Denwa Co., Ltd., Tokyo, Japan

[21] Appl. No.: 578,832

[22] Filed: Feb. 10, 1984

[30] Foreign Application Priority Data

Feb. 24, 1983 [JP] Japan ................................ 58-28560

[51] Int. Cl.$^4$ ............................ G02B 6/26; G02B 6/42
[52] U.S. Cl. .................................. 350/96.15; 350/370
[58] Field of Search ................... 350/96.15, 111, 394, 350/395, 370

[56] References Cited

PUBLICATIONS

"Temporal Coherence of Laser Fields Analyzed by Heterodyne Interferometry"; Halmos et al.; *Applied Optics;* vol. 21, No. 2; Jan. 15, 1982; pp. 265-273.

*Primary Examiner*—William L. Sikes
*Assistant Examiner*—Robert E. Wise
*Attorney, Agent, or Firm*—Martin Novack

[57] ABSTRACT

An optical de-polarizer is implemented by using an optical fiber, and/or a beam splitter coupled with output of said optical fiber. An optical fiber is longer than a predetermined length so that equation $|t_1-t_2|>t_c$ is satified where $t_1$ is polarization mode dispersion in a first optical fiber, $t_2$ is a polarization mode dispersion in a second optical fiber which is coupled with output of the first optical fiber, and $t_c$ is coherence time of a beam defined by an optical source. According to the present invention, one of the conditions (1) an angle between polarization axis of the first optical fiber and polarization axis of the second optical fiber is 45°, and (2) an angle between polarization axis of the optical fiber and polarization axis of the beam splitter is 45°, is satisfied.

2 Claims, 6 Drawing Figures

OPTICAL DE-POLARIZER

BACKGROUND OF THE INVENTION

The present invention relates to an optical depolarizer which converts a polarized beam to an unpolarized beam.

A conventional optical fiber cable which is used for an optical communication has the nature that the polarization of the beam in the cable depends upon the temperature change of the cable, and/or the external stress to the cable. Therefore, in an optical fiber communication system which includes an optical element which depends upon polarization, the detected level is affected by the polarization, and further, the polarization affects to an error rate of the communication system.

In order to solve the above problem, an input optical beam is de-polarized before the beam is applied to the optical element with polarization dependency so that the output level of the optical beam of the polarization dependent element becomes constant. The de-polarizer or de-polarization in the present specification means an element for converting a polarized beam to a non-polarized beam.

A prior de-polarizer is shown in FIG. 1, in which a pair of crystals in the shape of triangular column having complex refractive index are coupled together so that the angle between the polarization axes of two crystals is 90° or 45°. The operational principle of that device is shown in FIG. 2. In FIG. 2, an input optical beam 2-1 which expands spacially is applied to the de-polarizer 2-2, then, each optical energy at each portion is affected by the particular phase difference. Therefore, the output beam of the de-polarizer 2-2 is the sum of optical waves with different polarization, and the output beam 2-3 is as a whole non-polarized beam which has uniform output in all the polarization direction.

However, the de-polarizer in FIG. 1 has the disadvantages that the size of the device is large, and there is some difficulty to couple the device with an optical fiber since the structure of the crystal is not an optical waveguide.

SUMMARY OF THE INVENTION

It is an object, therefore, of the present invention to overcome the disadvantages and limitations of a prior de-polarizer by providing a new and improved de-polarizer.

It is also an object of the present invention to provide a de-polarizer which is small in size, and is coupled with an optical fiber cable with small insertion loss.

The above and other objects are attained by a depolarizer comprising a first optical fiber, a second optical fiber coupled with output of said first optical fiber, wherein each optical fiber is long enough to satisfy $|t_1 - t_2| > t_c$ where $t_1$ is polarization mode dispersion in said first optical fiber, $t_2$ is polarization mode dispersion in said second optical fiber, $t_c$ is coherence time of an optical beam, and an angle between polarization axis of said first optical fiber and polarization axis of said second optical fiber is approximately 45°.

Preferably, a beam splitter is provided at output of the second optical fiber so that angle between polarization axis of the second optical fiber and polarization axis of said beam splitter is approximately 45°.

BRIEF DESCRIPTION OF THE DRAWINGS

The foregoing and other objects, features, and attendant advantages of the present invention will be understood as those become better understood by means of the following description and accompanying drawings wherein.

DETAILED DESCRIPTION OF THE PREFERRED EMBODIMENTS

Figure 1:
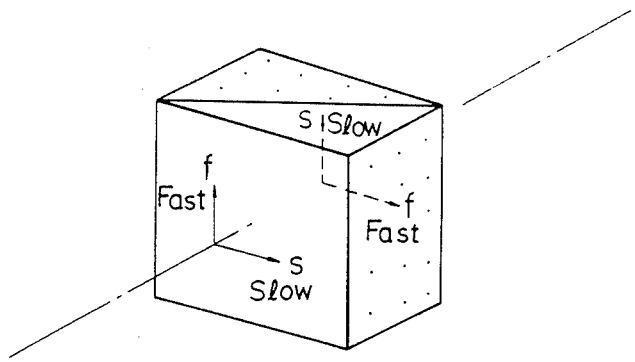
FIG. 1 shows a structure of a prior de-polarizer.
Figure 2:
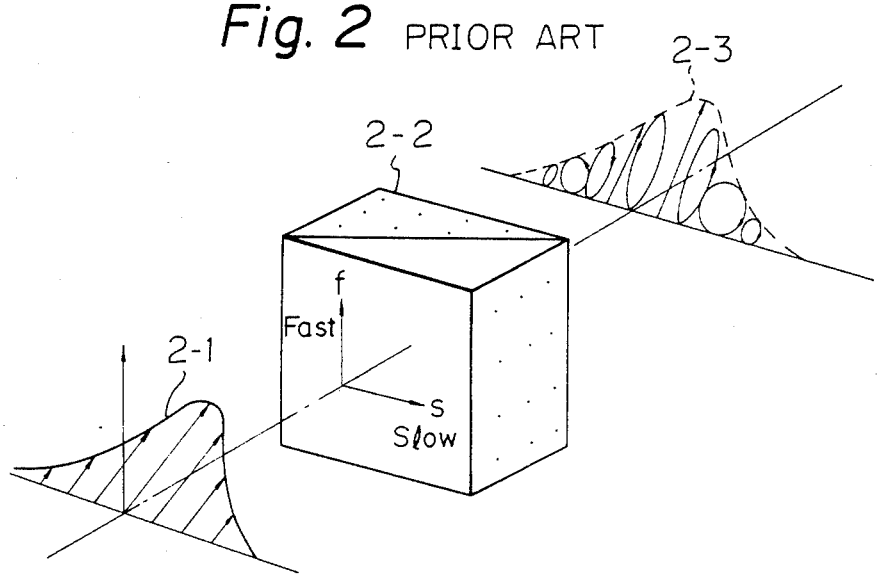
FIG. 2 shows the operation of the de-polarizer of FIG. 1.
Figure 3:
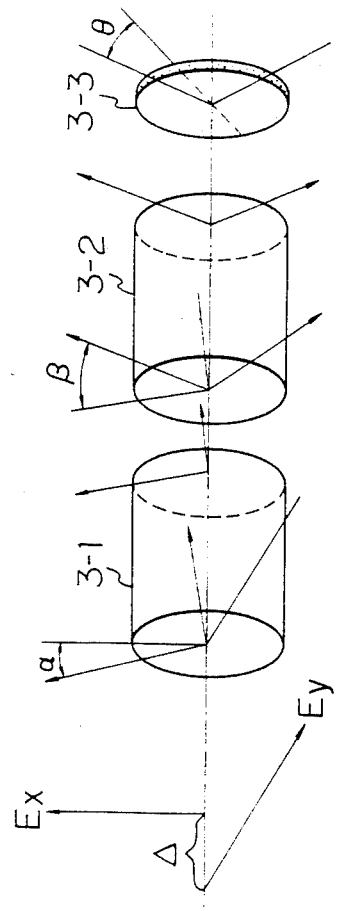
FIG. 3 shows operational principle of the de-polarizer according to the present invention.

The theoretical principle of the present invention is first described for the easy understanding of the invention. It has been known that a conventional optical fiber has a pair of perpendicular polarization axes which show complex refraction nature, and therefore, the transmission time difference (polarization mode dispersion) occurs between two modes each of which propagates along each of said polarization axis. FIG. 3 shows the structure in which two conventional optical fibers with said complex refraction nature are coupled in series. In the figure, the symbols $E_x$ and $E_y$ show the optical waves perpendicular to each other, and have the same level as each other. The symbol $\Delta$ is the phase difference between the waves $E_x$ and $E_y$, and $\Delta$ defines the polarization status of the input optical wave.

The present inventors discovered theoretically that the maximum polarization degree P at the output of the structure of FIG. 3 is shown in the following equation (1).

$$P = \cos 2\theta \cos 2(\beta) \sin 2(\alpha) \qquad (1)$$

where $(\alpha)$ is the angle between the fast polarization axis and the slow polarization axis, $(\beta)$ is the angle between the polarization axis of the first optical fiber 3-1 and the polarization axis of the second polarization axis 3-2, $(\theta)$ is the angle between the polarization axis (fast axis or slow axis) of the second optical fiber 3-2 and the polarization axis of the reception device or beam splitter 3-3. It is assumed in the equation (1) that $|t_1 - t_2| > t_c$ is satisfied where $t_1$ is the polarization mode dispersion in the first optical fiber 3-1, $t_2$ is the polarization mode dispersion in the second optical fiber 3-2, and $t_c$ is the coherence time of the optical source. It should be appreciated that a conventional semiconductor laser in multimode oscillation has the coherence time about 1 picosecond, and therefore, the polarization mode dispersion which satisfies said inequality is obtained by using a polarization conservative optical fiber with some stress longer than 1 or 2 meters.

In the equation (1), the case P=1 shows that the optical wave is completely polarized therefore the wave can return to a linear polarization, and the case P=0 shows that the optical wave is a complete unpolarized wave.

Accordingly, the present de-polarizer is accomplished by the particular structure which provides the condition P=0 in FIG. 3.

Figure 4:
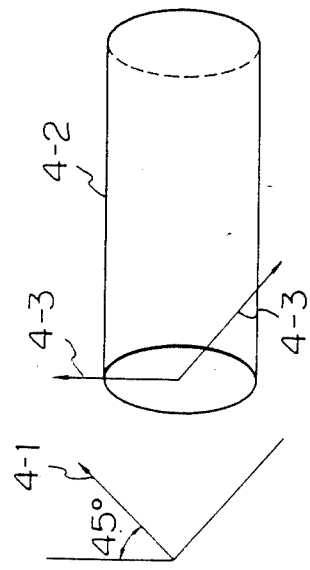
FIG. 4 shows a structure of the de-polarizer according to the present invention.

FIG. 4 is the embodiment of the present de-polarizer. The input optical beam 4-1 which is a linear polarization is applied to the optical fiber 4-2 so that the polarization axis of the beam 4-1 has the angle 45° with the polarization axis 4-3 of the optical fiber 4-2. Therefore, the value $(\alpha)=0$ in the equation (1) is satisfied, and thus, the value P=0 is satisfied. An optical beam generated by a semiconductor laser is usually a linear polarization, therefore, a de-polarized beam is obtained merely by coupling a semiconductor laser with the device of FIG. 4.

It is not necessary that the input beam 4-1 is a linear polarization, but any input polarization is used so long as the optical level along a pair of polarization axes of the optical beam 4-2 is equal to each other.

Figure 5:
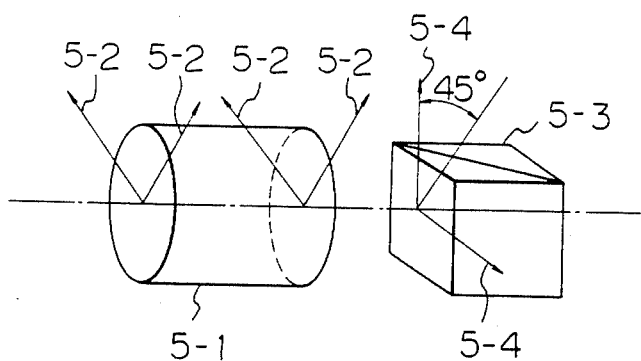
FIG. 5 is another structure of the de-polarizer according to the present invention.

FIG. 5 is another embodiment of the present invention, and FIG. 5 accomplishes the condition P=0 by satisfying $\theta=45°$. In the figure, 5-1 is an optical fiber, 5-2 is a polarization axis of the fiber 5-1, 5-3 is a beam splitter or an optical analyzer, 5-4 is a polarization axis of the beam splitter 5-3. In FIG. 5, the beam splitter 5-3 is positioned so that the polarization axis 5-4 of the splitter 5-3 has the angle 45° with respect of the polarization axis 5-2 of the optical fiber 5-2 which is coupled with said beam splitter 5-3. Therefore, the condition $\theta=45°$ in the equation is satisfied (P=0), and the output level of the beam splitter 5-3 is constant irrespective of the polarization status of an input beam to the fiber 5-1.

Figure 6:
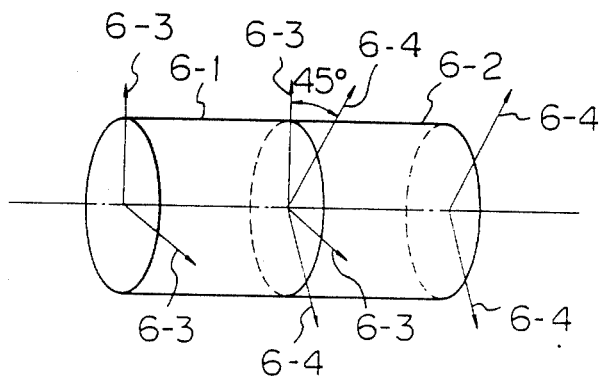
FIG. 6 is a still another structure of the de-polarizer according to the present invention.

FIG. 6 is still another embodiment of the present invention, and satisfies $(\beta)=45°$ in the equation (1) for satisfying P=0. In the figure, the numeral 6-1 is a first optical fiber, 6-2 is a second optical fiber, 6-3 is a polarization axis of the first optical fiber 6-1, and 6-4 is a polarization axis of the second optical fiber 6-2. In FIG. 6, the first optical fiber 6-1 and the second optical fiber 6-2 are positioned so that the polarization axis 6-3 of the former has the angle 45° with resepect to another polarization axis 6-4 of the second optical fiber 6-2. Therefore, $(\beta)=45°$ in the equation (1) is satisfied.

It should be appreciated that a minor angle error in positioning an optical fiber and/or a beam splitter is allowable if some residual polarization in output beam is allowed. Further, even when said conditions of $t_1$, $t_2$ and $|t_1-t_2|>t_c$ are not completely satisfied, the polarization of a beam is considerably weakened.

As described above, according to the present invention, a de-polarizer is implemented by an optical fiber, therefore, the insertion of the present de-polarizer into an optical communication system is quite simple, and very small insertion loss of the de-polarizer is obtained. The coupling of the present de-polarizer with an communication system is accomplished by for instance melting process. Therefore, the present invention is useful for an optical fiber and/or an optical fiber sensor which do not match with a polarized beam.

From the fogegoing, it will now be apparent that a new and improved optical de-polarizer has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical de-polarizer for providing de-polarized optical beam comprising;
    a first optical fiber,
    a second optical fiber coupled with output of said first optical fiber,
    wherein $|t_1-t_2|>t_c$ is satisfied where $t_1$ is polarization made dispersion in said first optical fiber, $t_2$ is polarization made dispersion in said second optical fiber, $t_c$ is coherence time of an optical beam, and an angle between polarization axis of said first optical fiber and polarization axis of said second optical fiber is approximately 45°.

2. An optical de-polarizer according to claim 1, further comprising a beam splitter coupled with output of said second optical fiber, wherein an angle between polarization axis of said second optical fiber and polarization axis of said beam splitter is approximately 45°.

* * * * *